US011926957B2

(12) United States Patent
Klausmann et al.

(10) Patent No.: US 11,926,957 B2
(45) Date of Patent: Mar. 12, 2024

(54) FIBER PRODUCTS WITH A COATING FORMED FROM AQUEOUS POLYMER DISPERSIONS

(71) Applicant: CHT Germany GMBH, Tübingen (DE)

(72) Inventors: Amon-Elias Klausmann, Reutlingen (DE); Jan-Valentin Rolle, Reutlingen (DE); Ulrike Henkel, Tübingen (DE); Michael Hees, Meßstetten (DE)

(73) Assignee: CHT GERMANY GMBH, Tübingen (DE)

( * ) Notice: Subject to any disclaimer, the term of this patent is extended or adjusted under 35 U.S.C. 154(b) by 566 days.

(21) Appl. No.: 16/761,603

(22) PCT Filed: Oct. 30, 2018

(86) PCT No.: PCT/EP2018/079737
§ 371 (c)(1),
(2) Date: May 5, 2020

(87) PCT Pub. No.: WO2019/091832
PCT Pub. Date: May 16, 2019

(65) Prior Publication Data
US 2020/0270804 A1    Aug. 27, 2020

(30) Foreign Application Priority Data

Nov. 10, 2017 (DE) .................. 102017126447.7

(51) Int. Cl.
*D06M 15/263* (2006.01)
*D06M 15/233* (2006.01)
(Continued)

(52) U.S. Cl.
CPC ........ *D06M 15/263* (2013.01); *D06M 15/233* (2013.01); *E04C 2/06* (2013.01);
(Continued)

(58) Field of Classification Search
CPC .......... B32B 27/12; D06N 3/04; D06N 3/042; D06M 15/263; D06M 2101/18; E04C 2/06; C04B 28/00; C04B 28/02; C04B 28/04
See application file for complete search history.

(56) References Cited

U.S. PATENT DOCUMENTS

| 4,910,076 A | 3/1990 | Ando et al. |
| 6,231,921 B1 * | 5/2001 | Hashemzadeh .......... D06N 3/04 427/370 |

(Continued)

FOREIGN PATENT DOCUMENTS

| DE | 19733067 A1 | 2/1999 |
| DE | 10216608 A1 | 10/2003 |

(Continued)

OTHER PUBLICATIONS

Espacenet translation of JP-2006052500-A (Year: 2006).*
(Continued)

*Primary Examiner* — Jeremy R Pierce
*Assistant Examiner* — Christine X Nisula
(74) *Attorney, Agent, or Firm* — Seth L. Hudson; Maynard Nexsen PC

(57) ABSTRACT

The present invention relates to textile fibre products having a coating comprising polymers based on ethylenically polymerisable monomers with a glass transition temperature of at least 60° and a coating method for coating fibre products with an aqueous polymer dispersion, wherein an aqueous polymer dispersion based on vinyl polymerisable monomers with a glass transition temperature of at least 60° C. is firstly provided, and this is brought into contact with a fibre product and then dried. The invention also relates to the use of corresponding polymer dispersions for the coating of fibre products, correspondingly coated fiber products, use thereof to reinforce mineral matrices, and corresponding (Continued)

fibre-composite materials, in particular textile-concrete composite materials. In particular, the invention relates to a coating means that can be applied to a textile fabric in a continuous, water-based process and enables an optimal introduction of force from the mineral matrix into the textile reinforcement.

7 Claims, 1 Drawing Sheet

(51) Int. Cl.
*E04C 2/06* (2006.01)
*D06M 101/18* (2006.01)
*D06M 101/36* (2006.01)
*D06M 101/40* (2006.01)

(52) U.S. Cl.
CPC .... *D06M 2101/18* (2013.01); *D06M 2101/36* (2013.01); *D06M 2101/40* (2013.01)

(56) References Cited

U.S. PATENT DOCUMENTS

| | | | |
|---|---|---|---|
| 6,632,309 B1 | 10/2003 | Hendrix et al. | |
| 2001/0023568 A1 | 9/2001 | Edwards et al. | |
| 2006/0240236 A1* | 10/2006 | Bland | E04C 2/043 428/292.1 |
| 2017/0305783 A1* | 10/2017 | Faynot | C03C 13/06 |

FOREIGN PATENT DOCUMENTS

| | | |
|---|---|---|
| DE | 102005048190 A1 | 4/2007 |
| DE | 102008040919 A1 | 2/2010 |
| DE | 102011005638 A1 | 12/2011 |
| EP | 0227207 B1 | 12/1992 |
| EP | 0987363 | 3/2000 |
| EP | 2666922 B1 | 7/2005 |
| EP | 2894272 A2 | 7/2015 |
| EP | 2530217 B1 | 10/2015 |
| JP | 2-112454 H | 4/1990 |
| JP | 2006052500 A * | 2/2006 |
| WO | 2004/000761 A1 | 12/2003 |
| WO | 2014/106685 A1 | 7/2014 |
| WO | 2017/156206 A1 | 9/2017 |

OTHER PUBLICATIONS

Doctoral Thesis of M. Schleser "Einsatz polymerimprägnierter, alkaliresistenter Glastextilien zur Bewehrung zementgebundener Matrices", Aachener Berichte Fugetechnik, vol. Jun. 2008, Editor: Prof. Dr. Ing. U. Reisgen, Nov. 1, 2008, Shaker Verlag.
Manfred Curbach, Regine Ortlepp (Edts.) SFB 528 Textile Bewehrungen zur bautechnischen Verstärkung und Instandsetzung, Final Report—shortened version—for the period Feb. 2008-Jan. 2011.
International Search Report for International Application No. PCT/EP2018/079737 dated Jan. 8, 2019.

* cited by examiner

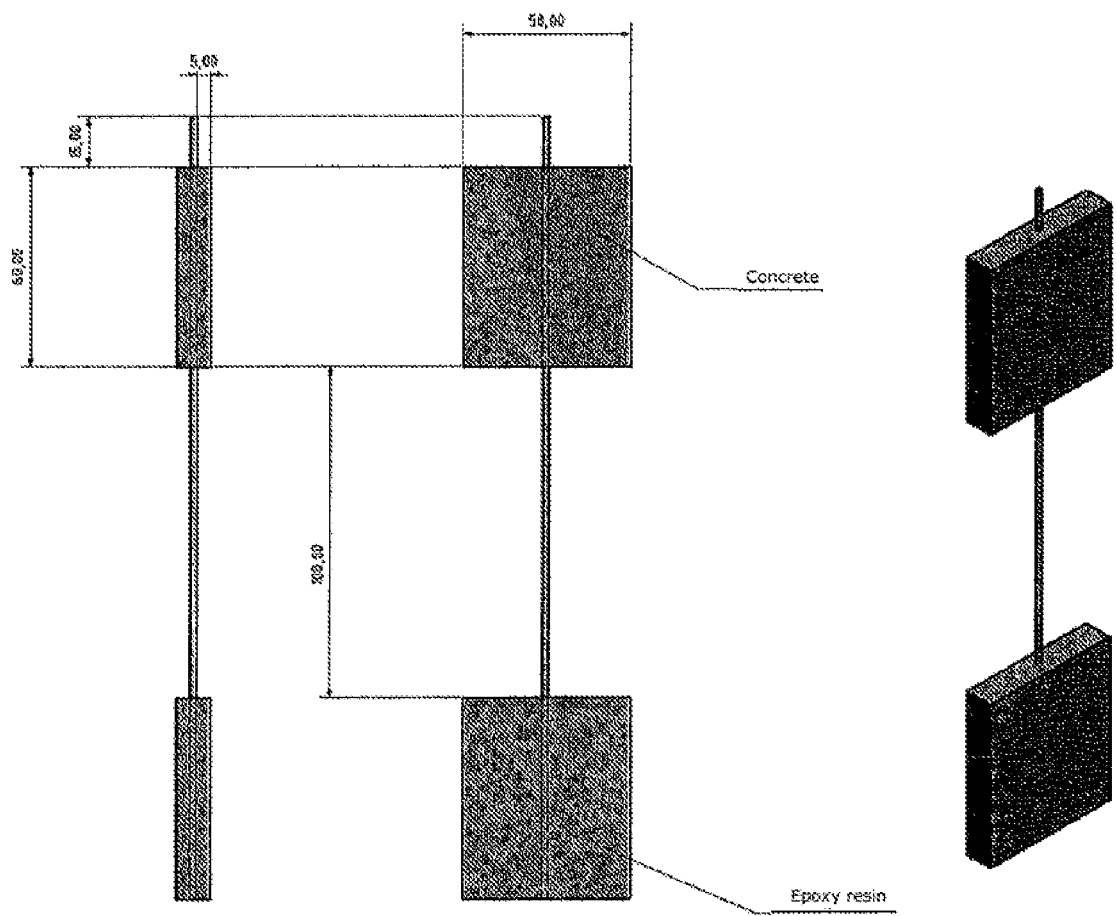

FIBER PRODUCTS WITH A COATING FORMED FROM AQUEOUS POLYMER DISPERSIONS

FIELD OF THE INVENTION

The present invention relates to textile fiber products with a coating comprising polymers based on ethylenically polymerizable monomers having a glass transition temperature of at least 60°, and to a coating process for coating fiber products with an aqueous polymer dispersion, in which at first an aqueous polymer dispersion based on ethylenically, especially vinylically, polymerizable monomers having a glass transition temperature of at least 60° C. is provided, then contacted with a fiber product, followed by drying.

The invention further relates to the use of corresponding polymer dispersions for coating fiber products, to correspondingly coated fiber products, to the use thereof for reinforcing mineral matrices, and to corresponding fiber composite materials, especially textile-concrete composite materials. In particular, the invention relates to a coating agent that can be applied to a textile sheet in a continuous water-based process, enabling an optimum dissipation of force from the mineral matrix into the textile reinforcement.

BACKGROUND OF THE INVENTION

Steel-reinforced concrete has become indispensable in modern construction industry. It offers high robustness at an acceptable price. A disadvantage of this material is the tendency of the reinforcing steel to corrosion. In the 1990's, fiber-reinforced concrete also became established as an alternative to steel-reinforced concrete. In this case, mostly steel or plastic fibers are admixed with the concrete. These fibers are non-oriented within the matrix. The approach of using oriented fibers in the form of reinforcing structures is relatively new: For almost 20 years, basic research in this textile-reinforced concrete composite material has been made.

In textile-reinforced concrete, continuous fibers (filaments) made of, for example, glass, basalt and carbon, are employed in the form of two- or three-dimensional textile sheets or steric structures. In principle, suitable fibers include those having a high strength and high rigidity, or having a modulus of elasticity comparable to that of steel, such as alkali-resistant glass fibers or carbon fibers. The technical textiles can be tailored to the stress they will experience using the geometry of the non-woven scrims. The variable distances between yarns in the non-woven scrims result in a specific grain composition of the concrete. It has a smaller maximum grain diameter as compared to conventional cements. Therefore, fine-grained concretes are employed in combination with textile reinforcements. The distances between the carbon fiber strands in the scrim are essential to the dimensions of the components. The reduced grain size improves the penetration of the scrims, and sustainable composites between several textile concrete layers can be realized.

The use of textile reinforcements enables some interesting improvements to be achieved with respect to processing as well as properties of composites. The greatest advantage is the omission of the additional concrete cover as a corrosion protection as usual in steel-reinforced concrete. In textile-reinforced concrete, the layer thickness of the concrete is determined, in addition to the concrete properties, only by the geometry and strength of the yarn and fiber composite materials employed, in order to ensure the minimum requirements of loadability for the composite. Thus, the total thickness of a component can be reduced to about a quarter of the typical thickness of a steel-reinforced concrete component, and material savings of up to 80% are reported. This enables a lighter construction and the realization of shapes and applications that have been deemed impossible for non-biased reinforcement systems to date, since the components can be made thinner while keeping the same sustainability.

Textile reinforcement structures have a higher effectiveness in improving composite properties if they are introduced as geometric structures. They have found commercial use as reinforcement elements in concrete components, or as reinforcing structures in the field of the maintenance of buildings. Since the requirements for textile reinforcement structures are diverse, a wide variety of different fiber types are employed. The range includes inorganic fibers, such as carbon, glass and basalt fibers, as well as organic fibers of aramid, polyethylene or polypropylene. Textile-reinforced concrete structures are having numerous interesting applications even today, for example, for the later reinforcement and maintenance of buildings, or as facade elements.

WO 2004/007161 A1 describes the application of textile-reinforced concrete structures for reinforcing concrete sewage pipes. The reinforcement of road surfaces made of asphalt and concrete has been known from U.S. Pat. No. 6,632,309 B1. The preparation of ready-made concrete parts is disclosed in EP 2 894 272 A2 and also in WO 2014/106685 A1.

For preparing the textile reinforcement structures, the sized filament fibers are usually processed at first into a yarn or rovings (bundle, multifilament yarn, by analogy to DIN 60 001, Part 2) of several thousands of filaments, and bundled. Subsequently, these are processed by textile processes into a reinforcing textile with a defined geometry. After the processing, these textiles are soaked with a polymeric material. This soaking/coating possibly includes all the individual filaments, and thus enables the interior bonding of the fibers or roving, and the bonding of the marginal fibers to the concrete, the so-called outer bonding. Further, the coating causes stabilization of the shape of the scrims, and ensures the geometric accuracy of the reinforcement. This process step can be performed, on the one hand, in the form of a discontinuous textile process by soaking and curing with a reactive resin. In these processes, epoxy resins or unsaturated polyester resins are used, for example. On the other hand, composite textiles can be soaked with a coating agent in a continuous textile coating process, for example, by padding.

To date, for example, carboxylated styrene-butadiene copolymers (so-called X-SBR) have been employed in such processes. After the soaking, the coated sheets go through drying and curing steps. The thus prepared composite textiles can be used as a drapable rolled good for applications in the field of maintenance or as sheet goods in new construction, or for ready-made construction parts, depending on the properties of textile geometry and the coating employed. The corresponding composite material is obtained by appropriately introducing these textile sheets into a matrix material. If concrete or cement-like and/or mineral matrix materials are used as matrix materials, the composites are referred to as textile-reinforced concrete components or structures.

The textiles used as a reinforcement in the concrete have the function to take up the loads acting from outside, especially in the form of tensile forces, through the interface with the concrete. Within the composite structure, i.e., especially within each individual roving, such tensile forces must be transferred to the individual filaments. The complete utilization of the fiber properties is only possible by soaking the rovings with a suitable material, and enables substantially higher tensile strengths (>40%) to be achieved as compared to the unsoaked roving. Within this composite material, the coating agent has the function to ensure an optimum composite bonding from the concrete matrix into the composite textile. Thus, the polymeric coating material is of key importance in view of the properties of the overall component: It enables an optimum force introduction both at the concrete/composite textile interface, and between the respective individual filaments of a roving within the composite textile.

The performance of a composite material, such as textile-reinforced concrete, is determined by the force transfer at the mentioned interfaces. In particular, this means that these properties must be ensured under the demanded environmental influences and throughout the service life of the component. Thus, textiles are exposed to temperature conditions in outdoor use of, for example, −30° C. to +100° C., have to withstand the alkaline pore solution of the concrete, or be resistant also against salt exposure, depending on the application. This results in high requirements for the coating materials to be selected.

For the reinforcement field, a general building approval by the Deutsehes institut für Bautechnik in der Bundesrepublik Deutschland (abZ) exists for the commercial product TUDALIT® (Z-31.10-182). It describes an aqueous coating material based on a dispersion of a carboxylated styrene-butadiene copolymer (so-called X-SBR), which is cross-linked by melamine-formaldehyde resins. The thus obtained systems exhibit sufficient resistance towards the alkaline medium of the concrete pore solution and have a moderate level of yarn tensile strength close to 1700 NT/mm². Further, the binder system can be applied through a continuous soaking and/or casting process, and the manufactured grids can be wound up on rolled goods because of their property profile, and adapted to the required geometries by bending/reforming on the construction site within certain limits. However, it may be mentioned that the time window for the processing (pot time) is very narrow because of the use of the reactive melamine/formaldehyde cross-linker, which considerably limits the practicability of this system. Further, it is disadvantageous that the composite strengths that can be achieved with this system require high anchoring lengths. In addition, the composite properties measured in the textile-reinforced concrete component are found to be very highly temperature-dependent: Because of the low glass transition temperature of the X-SBR, use thereof in outdoor applications is not possible, and correspondingly, the approval was granted only for the indoor field and for temperatures of up to 40° C. A similar system is used in DE 10 2005 048 190 A1.

In addition, the use of aqueous polymer dispersions as a coating for textile reinforcements in concrete is described in EP 2004712 B1. Here, an aqueous polychloroprene dispersion is employed in combination with inorganic particles for fiber-reinforced concrete. The fabrication of a stiff textile was achieved by the crystallinity of the polychloroprene coating after film formation or drying. However, a really relevant upgrading of the mechanical properties in the composite is achieved only by adding inorganic particles in the same coating. Further, AR glass fibers were coated with polyacrylate dispersions as early as in 2001, in order to test them for use in textile-reinforced concrete components (Doctoral Thesis of M. Schleser "Einsatz polymerimprägnierter alkaliresistenter Glastextilien zur Bewehrung zementgebundener Matrices", Aachener Berichte Fügetechnik, Volume 06/2008, Editor Prof. Dr. Ing. U. Reisgen, Nov. 1, 2008, Shaker Verlag), However, polymers having a glass transition temperature of clearly below 60° C. were exclusively employed, and the properties of the components at higher application temperatures were not examined.

For use in a higher temperature range, curable reactive resin systems, especially epoxy resins, are employed as polymeric matrix materials in reinforcing textiles. Such systems are described, for example, in DE 102008040919 A1 and EP 2 530 217 B1. The composite materials mentioned therein consist of reinforcing textiles made of technical fibers, such as glass, carbon, basalt or aramid, in cement-bonded systems. Reinforcing structures of high rigidity and strength are obtained by using epoxy resins. The tensile strengths that can be reached in the case of carbon fibers are close to 3500 N/mm². The bonding strength, anchoring length and resistance towards the alkaline mineral matrix in cement-bonded systems are described as good. These systems ensure the retention of bonding properties for temperatures up to 100° C., which is why applications in the outdoor field are possible here. However, the reinforcing textiles coated with reactive resin, especially epoxy resin, can be produced only discontinuously, and because of their stiffness, they can no longer be wound around rolls, or draped around existing geometries.

In addition, these reactive resins, especially epoxy resins, have short processing times of usually below 90 minutes. The composite properties in the concrete component and the temperature dependency of the composite properties are well examined and have been published within the scope of the special research fields 528 and 532 of the Deutsche Forschungsgemeinschaft (DFG) (for example, Manfred Curbach, Regine Ortlepp (Edts.) SFB 528 Textile Bewehrungen zur bautechnischen Verstärkung and Instandsetzung, Final Report—shortened version—for the period 2008/2-2011/1). All in all, the use of reactive resin systems for soaking textile reinforcements for concrete structures is state of the art. This is also described in EP 2 666 922 B1, in which plastic-reinforced rovings, for example, long glass fibers soaked with epoxy resin and dried at 80° C. (so-called prepregs), are used as reinforcing structures. Lightweight concrete-reinforcing units made of resin-soaked fiber materials are also described in EP 0 227 207 B1; here, virtually all commercially available reactive resin systems are used in addition to epoxy resin systems. In U.S. Pat. No. 4,910,076 A, two different approaches are combined, and a fiber network soaked with reactive resin (polyurethane or epoxide) is subsequently coated with a self-cross-linking SBR dispersion.

When curable reactive resins, for example, epoxy resins, are used as polymeric coating materials, grids are obtained that are characterized by a high level of yarn tensile strengths on carbon fibers of up to 3500 N/mm², and a high stability to alkali. In addition, the composite properties in textile-concrete composites are thermally stable up to 100° C. However, it is a drawback that a continuous application of the soaking material is not possible with these systems because of the limited processing times. Further, only stiff grids that are not drapable can be obtained, and therefore, the preparation of windable reinforcing textiles from which easily transported rolled goods can be prepared is not possible. A further drawback is the health risk from the processing of epoxy resins and amines in large scales.

Although the alternative coating agent based on carboxylated styrene-butadiene copolymers allows for the preparation of windable and drapable reinforcing textiles, which can be additionally produced in a continuous process in principle, the reinforcing textiles obtained exhibit low yarn tensile strengths on carbon fibers of 1700 N/mm². Further, in order to achieve sufficient composite properties in a textile-concrete composite, large anchoring lengths are required, which is basically disadvantageous with respect to the dimensioning and design of construction components. In addition, composite properties can be ensured only up to 40° C. with this coating system, which is an essential limitation for commercial applications, especially in the outdoor field.

According to the prior art, coating systems based on polychloroprene dispersions result in sufficiently good composite properties only in combination with inorganic particles. The properties relating to temperature resistance and resistance to alkali are not substantiated by Examples.

BRIEF SUMMARY OF THE INVENTION

Therefore, as compared to the described prior art, the object of the present invention is to provide a polymeric coating agent that can be applied to a fibrous product in a continuous water-based process, and enables an optimum introduction of force from a mineral matrix into a textile reinforcement. The corresponding coated textile reinforcing structures are to be suitable for application in cement-like matrices, and be capable of being wound onto rolls (roller diameter from 20 cm). In particular, the tensile strengths of 48K carbon fiber rovings soaked with a coating agent according to the invention are to be within a temperature range of from −30 to +100° C. in a range of more than 3000 MPa. Further, the composite properties of the coated reinforcing structure in a textile-concrete composite are to be retained from −30° C. to +100° C., and there should be sufficient resistance to the alkaline environment in cement-like or minerally bound matrices.

BRIEF DESCRIPTION OF THE DRAWINGS

The present invention is illustrated and described herein with reference to the various drawings, in which like reference numbers denote like method steps and/or system components, respectively, and in which:

FIG. 1 is a test speciment of the present invention.

DETAILED DESCRIPTION OF THE INVENTION

In a first embodiment, the object according to the invention is achieved by a textile fibrous product having a coating comprising from 5% by weight to 100% by weight of applied material, based on the gross mass of the fibrous product, wherein the material comprises from 20 to 100% by weight of polymers based on ethylenically polymerizable monomers having a glass transition temperature of at least 60° C., from 0 to 80% by weight of cross-linking components; and from 0 to 20% by weight of other additives.

Preferably, the coating comprises from 10 to 60% by weight of the applied material.

Preferably, the polymerizable monomers are vinylically polymerizable.

In a preferred embodiment, the polymers can be obtained from a monomer composition, wherein said monomer composition contains from 5% to 100% of basis monomers A, from 0% to 50% of functional monomers B, and from 0% to 30% of cross-linking monomers C, respectively based on the total mass of the monomer composition, wherein, in particular, the basis monomers A are selected from the group of vinyl-aromatic monomers and $C_1$ to $C_{24}$ alkyl (meth)acrylates, especially the functional monomers B are selected from the group of (meth)acrylic acid, $C_2$ to $C_8$ hydroxyalkyl (meth)acrylates, $C_2$ to $C_8$ (alkyl)aminoalkyl (meth)acrylates, sulfonated monomers, phosphated monomers and vinylpyridines, especially the cross-linking monomers C comprise at least two ethylenically unsaturated non-conjugated groups, N-methylol groups, and/or epoxy groups.

Preferably, the cross-linking components comprise monomers C and/or external cross-linkers having reactivity towards the functional monomers B, especially those selected from the group of di-, tri- and/or polyfunctional unblocked or blocked isocyanates, epoxysilanes, formaldehyde resins, melamine resins, carbodiimides, and epoxy resins. These components react with the other components of the coating to undergo cross-linking.

The fibrous product according to the invention preferably comprises one-dimensional textile structures, two-dimensional textile sheets, and/or three-dimensional textile steric structures.

Preferably, the fibrous product according to the invention comprises, or consists of, carbon fibers, glass fibers, basalt fibers, aramid fibers, polyethylene fibers, and/or polypropylene fibers, including mixtures thereof.

In an alternative embodiment, the object according to the invention is achieved by a process for coating fibrous products with an aqueous polymer dispersion, especially for producing the fibrous products according to the invention, comprising i) providing an aqueous polymer dispersion that contains a polymer based on ethylenically, especially vinylically, polymerizable monomers having a glass transition temperature of at least 60° C. and optionally a suitable material for cross-linking the polymer;

ii) contacting a fibrous product with said aqueous polymer dispersion; and iii) drying the thus coated fibrous product, especially at room temperature or an elevated temperature of up to 220° C.

In the prior art to date, almost exclusively SBR and polychloroprene types have been employed for coating fibrous products with aqueous polymer dispersions, based on the argument that these are highly resistant in an alkaline environment. Now, within the scope of the present invention, it has been surprisingly found that certain dispersions of polymers, for example, based on (meth)acrylic monomers and/or styrenic monomers, also have a sufficiently high resistance to alkali. Surprisingly, aqueous dispersions of polymers having a glass transition temperature of at least 60° C. based on vinylically polymerizable monomers, optionally in combination with external cross-linkers, are well suitable for the coating of fibrous products for use in textile-concrete composite systems, which have the above mentioned properties.

Preferably, the glass transition temperature of the polymers in the dispersion employed is at least 70° C.

In a preferred embodiment of the process according to the invention, one-dimensional textile structures, two-dimensional textile sheets, and/or three-dimensional textile steric structures are employed as the fibrous product.

Suitable one-dimensional textile structures include, for example, yarns, ravings, threads and/or ropes, without being limited thereto. Suitable virtually two-dimensional textile sheets include, for example, non-woven scrims, woven fabrics, loop-formingly knitted fabrics, loop-drawingly knitted fabrics, stitch-bonded fabrics, non-woven fabrics and/or felts, without being limited thereto.

In a preferred embodiment of the process according to the invention, said fibrous product includes carbon fibers, glass fibers, basalt fibers, aramid fibers, polyethylene fibers, and/or polypropylene fibers. In particular, the fibrous product consists of fibers of one of these fiber types, or mixtures thereof.

Said contacting of the aqueous polymer dispersion and the fibrous product according to the invention can be effected in any way known from the prior art. Preferably, the fibrous product is contacted with the aqueous polymer dispersion by applying a continuous or discontinuous textile application method from the prior art. Particularly preferred application methods include soaking, mist-spraying, dipping, casting and/or jet-spraying, the invention not being limited to such methods. The thus achieved applied mass of material, based on the gross mass of the fibrous product, is from 5% by weight to 100% by weight, preferably from 10% by weight to 60% by weight, more preferably from 25% by weight to 50% by weight, even more preferably from 30% by weight to 40% by weight.

In a preferred embodiment of the process according to the invention, the proportions of the components of said aqueous polymer dispersion are selected to obtain a solids content of from 10% by weight to 70% by weight, more preferably from 25% by weight to 60% by weight, even more preferably from 40% by weight to 50% by weight, based on the total mass of the polymer dispersion. The solids proportion of the dispersion preferably contains from 20 to 100% by weight of polymer, from 0 to 80% by weight of cross-linker, and from 0 to 20% by weight of other additives, based on the solids fraction of the dispersion, the percentages summing up to 100%.

In addition to the main components described, the aqueous dispersion according to the invention may optionally contain further auxiliaries and additives known from the construction, textile and coatings industries, including but not limited to leveling auxiliaries, wetting agents, defoamers, debubbling agents, organic and inorganic thickeners, tackifying resins, fillers, pH regulators, and/or preservatives.

In a preferred embodiment of the process according to the invention, the aqueous polymer dispersion based on vinylically polymerizable monomers is provided by suitable continuous, semi-continuous or discontinuous polymerization methods known from the prior art. Particularly preferred are emulsion polymerization, suspension polymerization, or dispersion polymerization. Even more preferably, the polymer dispersion is obtained by emulsion polymerization, which is technically established and has been described many times (Hans-Georg Elias, Makromoleküle Volume 3 "Industrielle Polymere and Synthesen", 6th Edition, Wiley-VCH). The polymer dispersion can be stabilized with the surfactants commonly used in the prior art, such as anionic surfactants, non-ionic surfactants, and/or protection colloids, and mixtures thereof, without the invention being limited thereto. For the initiation of the polymerization reaction, any suitable type of initiators may be used, including but not limited to peroxides, azo compounds and/or redox initiator systems. Further, reactants may be employed that are typically used in such a process, including but not limited to electrolytes, agents for adjusting the pH, and/or chain regulators/transfer agents.

In a preferred embodiment of the invention, the aqueous polymer dispersion is provided by polymerization of a monomer composition containing from 5% by weight to 100% by weight of basis monomers A, from 0% by weight to 50% by weight of functional monomers B, and from 0% by weight to 30% by weight of cross-linking monomers C, respectively based on the total mass of the monomer composition.

Suitable basis monomers A include, in particular, $C_1$ to $C_{24}$ alkyl esters of acrylic and methacrylic acids, as well as vinyl-aromatic monomers, such as styrene, a-methylstyrene, or vinylpyridine. These monomers can be employed alone or in any admixture thereof in such a way that the glass transition temperature of the resulting polymer is at least 60° C. The latter can be estimated from the glass transition temperatures of the monomers to be employed by means of the Fox equation (T. G. Fox, Bull, Am. Phys. Soc. 1, 123 (1956)) or Pochan equation (J. M. Pochan, C. L. Beatty, D. F. Hinman, Macromolecules 11, 1156 (1977)) as known to the skilled person.

In particular, the following monomers having a reactive group can be employed alone or in admixture as functional monomers B: (meth)acrylic acid, $C_2$ to $C_8$ hydroxyalkyl (meth)acrylates, such as hydroxyethyl methacrylate, $C_2$ to $C_8$ (alkyl)aminoalkyl (meth)acrylates, such as dimethylaminoethyl methacrylate, sulfonated monomers, such as sodium styrenesulfonate, phosphated monomers, such as monoacryloxyethyl phosphate, and/or vinylpyridines. The invention is not limited to the mentioned functional monomers. Each suitable functional monomer from the prior art can be employed. Suitable monomer are those in which the glass transition temperature of the resulting polymer is at least 60° C.

Monomers comprising at least two ethylenically unsaturated non-conjugated groups, N-methylol groups and/or epoxy groups are preferably employed as cross-linking monomers C. Suitable monomers include divinyl and polyvinyl monomers, such as divinylbenzene, di- or poly(meth)acrylates, di or polyallyl ethers, and di- or polyvinyl ethers of diols or polyols. Further, monomers may be employed that can still lead to cross-linking after the soaking process and the forming of the coating without an external cross-linker having to be added, such as N-methylolamide and/or glycidyl methacrylate.

In addition, an external cross-linker may be added to the aqueous polymer dispersion provided according to the invention, in order to improve the mechanical properties of the coated fibrous products and the composite properties of the resulting textile-concrete composites. Preferably, it has a reactivity matching that of the functional groups present in the polymer dispersion. For example, but without limitation, there may be employed blocked and unblocked polyisocyanates, carbodiimides, aziridines, epoxy resins, epoxysilanes, formaldehyde resins, urea resins, reactive phenol resins, without being limited thereto. Their application in the coating system is effected by mixing the polymer dispersion and the external cross-linker immediately before the contacting of the fibrous product and the aqueous polymer dispersion.

In an alternative embodiment, the object of the invention is achieved by a coated fibrous product obtainable by the coating process according to the invention. Preferably, the fibrous product according to the invention is obtainable by one of the preferred embodiments of the process according to the invention. Preferred embodiments of the process steps and of the reagents employed may also be combined.

The coated fibrous products according to the invention have an excellent tensile strength and bonding strength in the concrete and may thus be employed as a reinforcement of concrete to particular advantage. Thus, carbon fibers coated according to the invention show a comparable level of tensile strength and of extraction force from the concrete as that of an epoxy resin system corresponding to the prior art (cf. Table 1, entry 2, versus Table 3, entries 1-5). Thus, the use of such fibrous products is not exclusively, but particularly advantageous to the reinforcement of concrete and/or cement products. Further fibrous products coated according to the invention can be used for reinforcing existing concrete structures that are employed in the outdoor field (for example, facade plates or other exterior constructions) and exposed to temperatures or weathering conditions of up to 100° C.

A coating according to the invention based on said aqueous polymer dispersion is also highly interesting for use on hydrolytically sensitive fibrous materials, such as glass or basalt fibers. From the measured values shown in Table 3, entries 6 and 7, it is clear that good tensile strengths of the coated rovings are achieved at room temperature and at 100° C. These are clearly above the values achieved by coating with polymer dispersions not according to the invention (Table 2, entries 6 and 7). According to the manufacturer, the glass fiber used in the Examples passes class II of the so-called SiC tests ("Strength in Concrete", EN 14649). In these tests, glass fibers are embedded in concrete and stored at 80° C. and 80% relative humidity for 96 hours. In the subsequent test, the residual strength for granting class II must be at least 350 MPa for a starting strength of 1000 MPa, i.e., the decline may be 65% at most. If this glass fiber is coated according to the invention (see Table 3, entry 6), a significant increase of stability to alkali is achieved, because the decline of strength is only 35%. With basalt fibers coated according to the invention (Table 3, entry 7), the decline is 60%.

This shows that an aqueous polymer dispersion provided according to the invention surprisingly has a good resistance to alkali and is therefore excellently suitable for use as a coating of textile reinforcements for cement-bonded matrices. Table 3 states the values of extraction strengths of carbon fibers coated according to the invention in concrete (entries 1-5) at room temperature and at 80° C. In both cases, excellent values are achieved that are on the level of epoxy-coated fibers according to the prior art. Table 3 also states the corresponding values for glass fibers resistant to alkali (AR glass) (entry 6). These values are significantly higher than, for example, the values stated in the patent EP 2 004 712 B1.

Fibrous products made of carbon fibers and coated according to the invention also proved to be windable about a roller with a diameter of 20 cm along the machine running direction over a 12k roving.

In another embodiment, the object of the invention is achieved by the use of an aqueous polymer dispersion as provided in the above described process according to the invention as a coating agent for fibrous products. The aqueous polymer dispersion employed may have all the preferred features of the polymer dispersion employed in the process according to the invention. The use according to the invention enables the production of fibrous products according to the invention with the described advantages.

In another embodiment, the object of the invention is achieved by a composite material comprising a fibrous product coated according to the invention and a mineral matrix, especially a concrete matrix. More preferably, a composite material is made of a fibrous product according to the invention in a mineral matrix, especially a concrete matrix. In particular, the composite material according to the invention is a textile-concrete composite with the above described advantages of the invention. In particular, the composite material comprises a fibrous product according to the invention in the form of a one-dimensional textile structure, a two-dimensional textile sheet, and/or a three-dimensional textile steric structure.

In another embodiment, the object of the invention is achieved by the use of the coated fibrous products according to the invention, especially in the form of one-dimensional textile structures, two-dimensional textile sheets, and/or three-dimensional textile steric structures, for reinforcing mineral materials, especially for reinforcing concrete components. The use according to the invention enables the provision of the composite materials according to the invention with the above described technical advantages.

EXAMPLES

Using the process according to the invention, coated fibrous products and corresponding textile-concrete composite materials resulting therefrom were prepared. For this purpose, the polymer dispersions according to the invention were at first applied to carbon fibers of the type 3200tex from TohoTenax by soaking, followed by drying at 160° C. From the fibrous products obtained according to the invention, test specimens for determining the tensile strength at room temperature (RT), at 100° C. and after storage on alkali were prepared (see characterization methods/tensile test). Further, textile-concrete composite materials were prepared by embedding the fibrous products coated according to the invention in fine-grained concrete (test specimen see FIG. 1), and subjected to an extraction test (see characterization methods/extraction test).

In the same way, Examples with glass and basalt fibers as well as Comparative Examples with polymer dispersions not according to the invention and polymers from the prior art were performed.

The following measurements were performed: Tensile tests with the coated rovings at room temperature RT, at 100° C. and after storage in alkaline medium (ETAG004), extraction tests with the textile-concrete composites at room temperature RT and at 80° C. Table 1 shows the results of these tests for examples of the prior art. Table 2 shows the test values obtained for test specimens not prepared according to the invention. Table 3 summarizes the corresponding test values for test specimens prepared according to the invention.

In the following, the materials employed and the performance of the tensile test and extraction test experiments are described in more detail.

Materials Employed:
Rovings/Yarns:
  carbon fiber of type 3200tex from TohoTenax
  basalt fiber of type 2400tex from Deutsche Basalt Faser GmbH
  alkali resistant glass fiber of type 2400tex from Owens Coming
Fine-Grained Concrete:
  In a planetary agitator, 115 g of water and 1 kg of Pagel TF 10fine-grained concrete made from Portland cement were charged, and mixed for 5 min (according to the Technical Data Sheet of the concrete employed).
Polymer Dispersions:
  Commercially available products may be employed as polymer dispersions. In the stated Examples, model polymers were prepared by a classical semi-continuous emulsion polymerization process. The polymer dispersions all have a solids content of 47% by weight. In order to prepare polymers having a high glass transition temperature of 60°

C. and more according to the invention, monomer compositions having a high proportion of monomers that result in hard polymers, for example, styrene, were selected. Accordingly, polymers not according to the invention contained higher proportions of soft comonomers, for example, ethylhexyl acrylate. The exact composition for a particular glass transition temperature was estimated by means of the Fox equation, and confirmed by DSC measurements after the synthesis. The amount coated onto the fibers employed was at about 30% by weight for all aqueous binder dispersions employed.

The components of the epoxy resin system are based on commercially available cycloaliphatic epoxide with a cycloaliphatic amine as a hardener. The system was free of solvent and water. The amount coated was about 50% by weight of solids on the fiber after drying.

Cross-Linkers:

Cross-linker 1: blocked polyisocyanate from the company Covestro

Cross-linker 2: reactive polyisocyanate from the company Covestro

Characterization Methods

Coating of the Yarn

Yarns made of carbon, glass or basalt fibers may be used as the yarn to be finished. The yarns are coated or soaked in a manual process. During the coating, from 10 to 60% by weight of polymer is applied to the fiber. The thus coated yarn is subsequently dried at 160° C.

Tensile Test

DIN EN ISO 527-4 and DIN EN ISO 527-5 are the standards for fiber-reinforced materials (ERNI) relevant in Europe. The two standards only describe the tensile test of the FRMs. In this test, the stress/strain behavior in the limiting states 0° and 90° orientation of the fiber reinforcement is measured in order to be able to determine characteristics such as Poisson's ratio v, tensile strength sM, elongation at break eM, and the modulus of elasticity.

In plastics testing, the tensile test has a priority meaning and is considered a basic experiment under the quasistatic or static testing conditions.: crosshead is run at a constant speed according to the standard DIN EN ISO 527-4. The FRM usually show a hard and brittle behavior. Therefore, the tensile strength sM and the yield stress sY are the same. The breaking stress sB can fall on the same point. The test specimen type 1B from DIN EN ISO 527-4 is mainly used for fiber-reinforced thermoplasts and thermosets. The test specimen employed orients itself by it.

The materials are tested under three conditions: at room temperature, at 100° C., and after storage in alkaline medium. For the latter examination, the specimens are stored at 45° C. in a solution with pH 13.7 for 14 days, and tested at 45° C. without previous drying. The test solution orients itself by the solution in the composition described in ETAG004.

Extraction Test

In the general building approval by the Deutsches Institut für Bautechnik in der Bundesrepublik Deutschland (abZ) No. Z-31.10-182, the testing of the bonding strength of the textile towards fine-grained concrete is described. In this test, a textile-reinforced test specimen is loaded. The introduction of the force is effected through the clamping on the upper and lower sides of the test specimen. The textile reinforcement is oriented in the direction of load in the test specimen (0° with the direction of load). For evaluation, the maximum machine force $F_{max}$ is employed. For the characterization of the fiber strand specimens, a method analogous to the above method is used. It is also described elsewhere (State-of-the-Art report of RILEM Technical Committee TC 201-TRC; EP 2 004 712 B1) for characterizing the bonding strength between the yarn and textile. The coated yarns were embedded in concrete with dimensions of width×thickness=5 cm×6 cm with a concrete thickness of 1 cm in midway, as shown in FIG. 1. A concrete coverage of 0.5 cm was used by analogy with abZ No. Z-31.10-182. The coated yarns were prepared with 1.5 cm protrusion beyond the concrete in the extraction direction, in order to ensure that the bonding area to the concrete always remains the same during the testing. The test conditions were chosen by analogy with abZ No. Z-31.10-182. The test speed is 1 mm/min to 3 mm extraction length, and 5 mm/min from 3 mm extraction length, until extraction is complete. The test specimens are measured at room temperature and at 80° C. The maximum extraction force $F_{max}$ is evaluated.

TABLE 1

References to the prior art

| | Fiber type | Chemical structure[1] | Tg [° C.] | Functionality of polymer | Internal cross-linker | External cross-linker | Tensile strength RT [MPa] | Tensile strength ETAG004 [MPa] | Tensile strength $F_{max}$ [MPa][4] | Extraction strength $F_{max}$ RT [N] | Extraction strength $F_{max}$ 80° C. [N] |
|---|---|---|---|---|---|---|---|---|---|---|---|
| 1[2] | Carbon | SBR | −10 | carboxy | — | melamine resin | 2500 | 2400 | 2400[4*] | 660 | 180 |
| 2[3] | Carbon | EP | 100 | — | — | — | 3500 | 2700 | 3300 | >1500[5] | >1500[5] |

[1]SBR = styrene-butadiene rubber, EP = epoxy resin

[2]aqueous SBR dispersion Lefasol VL 90/1 (Lefatex)

[3]cycloaliphatic epoxide cured with cycloaliphatic amine, $T_g$ = 100° C.

[4]tensile strength at 45° C. after storage in concrete pore solution, pH 13.7, for 14 days without drying

[4*]tensile strength at RT for a coated roving after storage in concrete pore solution (pH 12.8) for 7 days with drying

[5]concrete cracked along the load during the testing because of too high bonding strengths

TABLE 2

Examples not according to the invention

| | Fiber type | Chemical structure[1] | $T_g$ [° C.] | Functionality of polymer | Internal cross-linker | External cross-linker | Tensile strength RT [MPa] | Tensile strength 100° C. [MPa] | Tensile strength ETAG004 [MPa][3] | Extraction strength $F_{max}$ RT [N] | Extraction strength $F_{max}$ 80° C. [N] |
|---|---|---|---|---|---|---|---|---|---|---|---|
| 1 | Carbon | ACR | 10 | — | — | — | 2900 | 2200 | 2800 | 520 | 78 |
| 2 | Carbon | ACR | 40 | — | — | — | 3700 | 2400 | 2900 | 580 | 170 |
| 3 | Carbon | ACR | 5 | Hydroxy | — | — | 3100 | 2400 | 2800 | 800 | 410 |
| 4 | Carbon | ACR | 5 | Hydroxy | — | Cross-linker 1 | 2900 | 2500 | 3100 | 680 | 340 |
| 5 | Carbon | ACR | 8 | — | PETA[2] | — | 2600 | 2000 | 2200 | 700 | 280 |
| 6 | AR | ACR | 5 | Hydroxy | — | Cross-linker 1 | 950 | 560 | 580 | 660 | 360 |
| 7 | Basalt | ACR | 5 | Hydroxy | — | Cross-linker 1 | 990 | 930 | 360 | 220 | 96 |

[1]ACR = pure acrylate, SAC = styrene acrylate
[2]PETA = pentaelythritol triacrylate
[3]tensile strength at 45° C. after storage in concrete pore solution, pH 13.7, for 14 days without drying

TABLE 3

Examples according to the invention

| | Fiber type | Chemical structure[1] | $T_g$ [° C.] | Functionality of polymer | Internal cross-linker | External cross-linker | Tensile strength RT [MPa] | Tensile strength 100° C. [MPa] | Tensile strength ETAG004 [MPa][3] | Extraction strength $F_{max}$ RT [N] | Extraction strength $F_{max}$ 80° C. [N] |
|---|---|---|---|---|---|---|---|---|---|---|---|
| 1 | Carbon | ACR | 70 | — | — | — | 3900 | 2700 | 3200 | 940 | 930 |
| 2 | Carbon | SAC | 115 | — | — | — | 3300 | 2800 | 2900 | 1000 | 100 |
| 3 | Carbon | SAC | 105 | Hydroxy | — | — | 3500 | 3000 | 3400 | >1500[4] | >1500[4] |
| 4 | Carbon | SAC | 105 | Hydroxy | — | Cross-linker 2 | 3900 | 3000 | 3600 | >1500[4] | >1500[4] |
| 5 | Carbon | ACR | 105 | — | PETA[2] | — | 3200 | 2900 | 3100 | >1500[4] | >1500[4] |
| 6 | AR glass | SAC | 15 | Hydroxy | — | Cross-linker 2 | 910 | 790 | 590 | 910 | 760 |
| 7 | Basalt | SAC | 105 | Hydroxy | — | Cross-linker 2 | 1100 | 1100 | 430 | 1000 | 1000 |

[1]ACR = pure acrylate, SAC = styrene acrylate
[2]PETA = pentaelythritol triacrylate
[3]tensile strength at 45°C. after storage in concrete pore solution, pH 13.7, for 14 days without drying
[4]concrete cracked along the load during the testing because of oo high bonding strengths

The invention claimed is:

1. A composite material made of a textile fibrous product having a coating comprising from 5% by weight to 100% by weight of an applied material, based on the gross mass of the fibrous product, wherein the material comprises from 20 to 100% by weight of polymers based on ethylenically polymerizable monomers, and wherein at least a portion of the monomers comprise basis monomers A that are selected from the group consisting of vinyl-aromatic monomers and $C_1$ to $C_{24}$ (meth)acrylates, the polymers have a glass transition temperature of at least 60° C.; from 0 to 80% by weight of cross-linking components; and from 0 to 20% by weight of other additives; within a concrete matrix.

2. The composite material according to claim 1, wherein said textile fibrous product is a textile fibrous product with a coating comprising from 10 to 60% by weight of the applied material based on the gross mass of the fibrous product.

3. The composite material according to claim 1, wherein said ethylenically polymerizable monomers are vinylically polymerizable.

4. The composite material according to claim 1, wherein said polymers can be obtained from a monomer composition, wherein said monomer composition contains from 5% to 100% of the basis monomers A, from 0% to 50% of functional monomers B, and from 0% to 30% of cross-linking monomers C, based on the total mass of the monomer composition, wherein the functional monomers B are selected from the group of (meth)acrylic acid, $C_2$ to $C_8$ hydroxyalkyl (meth)acrylates, $C_2$ to $C_8$ (alkyl)aminoalkyl (meth)acrylates, sulfonated monomers, phosphated monomers and vinylpyridines, the cross-linking monomers C comprise at least two ethylenically unsaturated non-conjugated groups, N-methylol groups, and/or epoxy groups.

5. The composite material according to claim 4, wherein the cross-linking components comprise monomers C and/or external cross-linkers having reactivity towards the functional monomers B.

6. The composite material according to claim 1, wherein said textile fibrous product comprises one-dimensional textile structures, two-dimensional textile sheets, and/or three-dimensional textile steric structures.

7. The composite material according to claim 1, wherein said textile fibrous product comprises carbon fibers, glass fibers, basalt fibers, aramid fibers, polyethylene fibers, and/or polypropylene fibers, including mixtures thereof.

* * * * *